(12) United States Patent
Ellis

(10) Patent No.: US 12,461,356 B1
(45) Date of Patent: Nov. 4, 2025

(54) BRACKET TO MOUNT A MOTION SENSOR TO BINOCULARS

(71) Applicant: The United States of America as represented by the Secretary of the Navy, Newport, RI (US)

(72) Inventor: David M Ellis, North Kingstown, RI (US)

(73) Assignee: The United States of America as represented by the Secretary of the Navy

( * ) Notice: Subject to any disclaimer, the term of this patent is extended or adjusted under 35 U.S.C. 154(b) by 605 days.

(21) Appl. No.: 17/901,060

(22) Filed: Sep. 1, 2022

(51) Int. Cl.
  *G02B 23/18*   (2006.01)
  *G01D 11/24*   (2006.01)

(52) U.S. Cl.
  CPC ........... *G02B 23/18* (2013.01); *G01D 11/245* (2013.01)

(58) Field of Classification Search
  CPC ....... G02B 23/18; G02B 23/16; G01D 11/245
  See application file for complete search history.

(56) References Cited

U.S. PATENT DOCUMENTS

| | | | | |
|---|---|---|---|---|
| 2015/0235426 A1* | 8/2015 | Lyons | ..................... | A63F 13/26 345/8 |
| 2017/0363855 A1* | 12/2017 | Arbouzov | ............. | G02B 23/18 |
| 2022/0082812 A1* | 3/2022 | Ruehl | .................... | G02B 23/18 |
| 2024/0402497 A1* | 12/2024 | Dave | ..................... | G02C 11/10 |

\* cited by examiner

*Primary Examiner* — Collin X Beatty
*Assistant Examiner* — Jennifer A Jones
(74) *Attorney, Agent, or Firm* — James M. Kasischke; Jeffry C. Severson

(57) ABSTRACT

A bracket is provided that is capable of attaching a sensor for a tracking system to a pair of binoculars. The bracket includes a body having a top and a bottom. The body has front face and a wall perpendicular to the front face and surrounding the front face. The wall is adapted to be mounted on binoculars. An elongate slot is located in the top of the body. A cable pathway is located within the body opposite the elongate slot. A tab extends from the bottom of the body so that the tab can be removably affixed to the binoculars.

8 Claims, 3 Drawing Sheets

BRACKET TO MOUNT A MOTION SENSOR TO BINOCULARS

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS REFERENCE TO OTHER PATENT APPLICATIONS

None.

BACKGROUND OF THE INVENTION

1) Field of the Invention

The present invention is directed to a bracket that can be attached to binoculars to support a sensor for motion tracking and integration into video simulation.

2) Description of the Related Art

Currently binoculars can have sensors integrated directly into the binoculars. In some cases, added sensors can be permanently mounted to the binoculars. Such an invasive modification can lead to greater downtime if the sensor or binoculars become disabled.

As such, there remains a need for a bracket that can be attached to binoculars and that allows a maintainer to quickly remove and replace a sensor for use with the binoculars while minimizing the unavailability of the binoculars and sensor.

SUMMARY OF THE INVENTION

The invention disclosed herein describes a bracket that mounts a sensor to binoculars, allowing for motion tracking and integration into video simulation.

The bracket includes a body having a top and a bottom. The body has front face and a wall perpendicular to the front face and surrounding the front face. The wall can be mounted on binoculars. An elongate slot is located in the top of the body. A cable pathway is located within the body opposite the elongate slot. A tab extends from the bottom of the body.

In another embodiment of the invention, a device is provided that is removably attachable to binoculars. The device has a wall for surrounding an end of the binoculars. A planar front face is attached perpendicular to the wall with the wall surrounding a periphery of the planar front face. A tab extends from the wall opposite the planar front face. The wall includes an elongate slot capable of receiving a sensor for a motion tracker and includes a cable pathway capable of passing a cable from the sensor therethrough. The cable pathway is opposite the elongate slot. The tab is removably affixed to the binoculars.

In yet another embodiment of the invention, a binocular mounted device has an open-topped body for accommodating binocular barrels. The open-topped body includes a front face and a wall perpendicular to and surrounding the front face and providing a space between an end of the binoculars and the front face. The wall includes an elongate slot capable of receiving a sensor in the space between the end of the binoculars and the front face.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
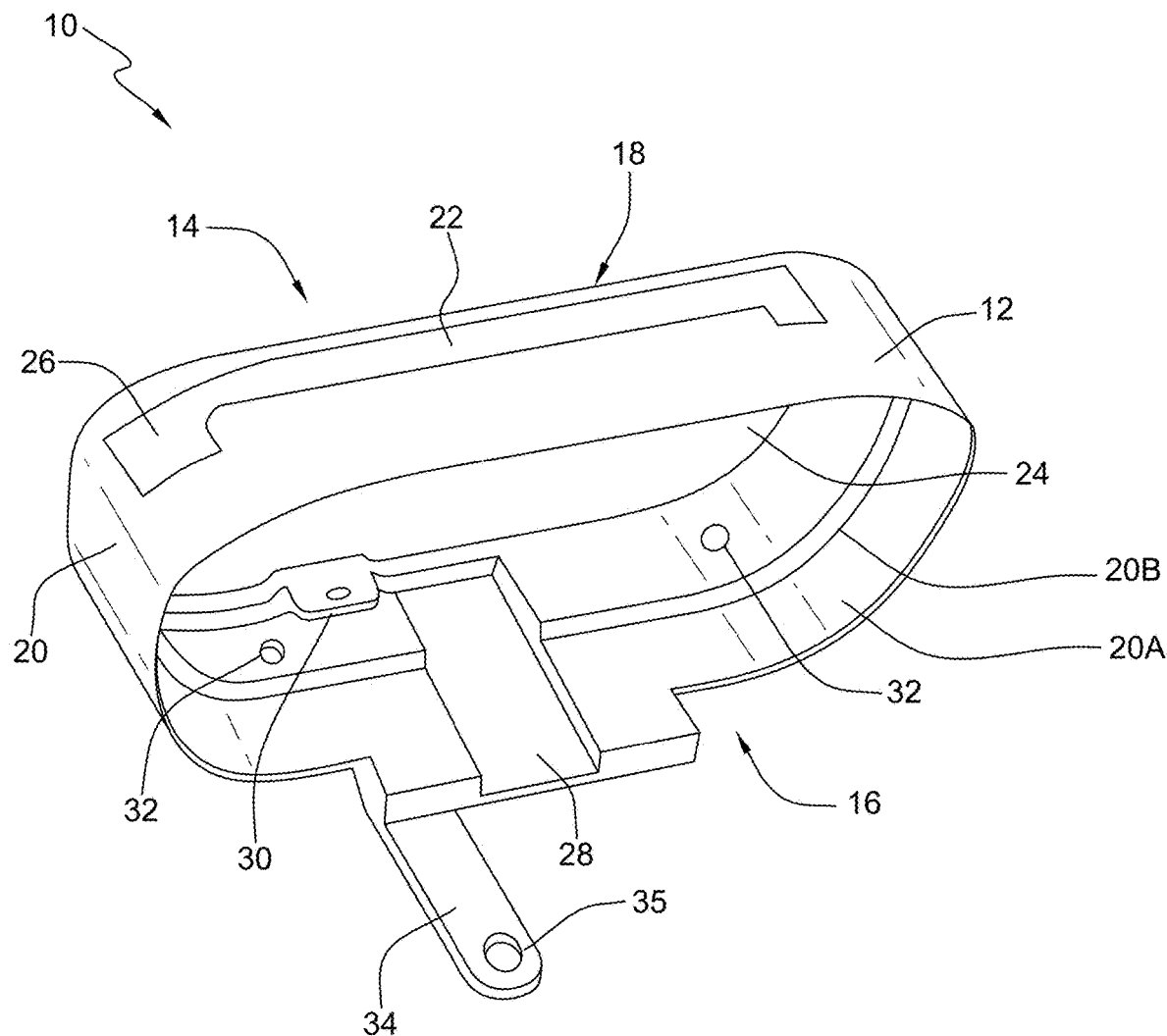
FIG. 1 is a perspective view of a bracket.
Figure 2:
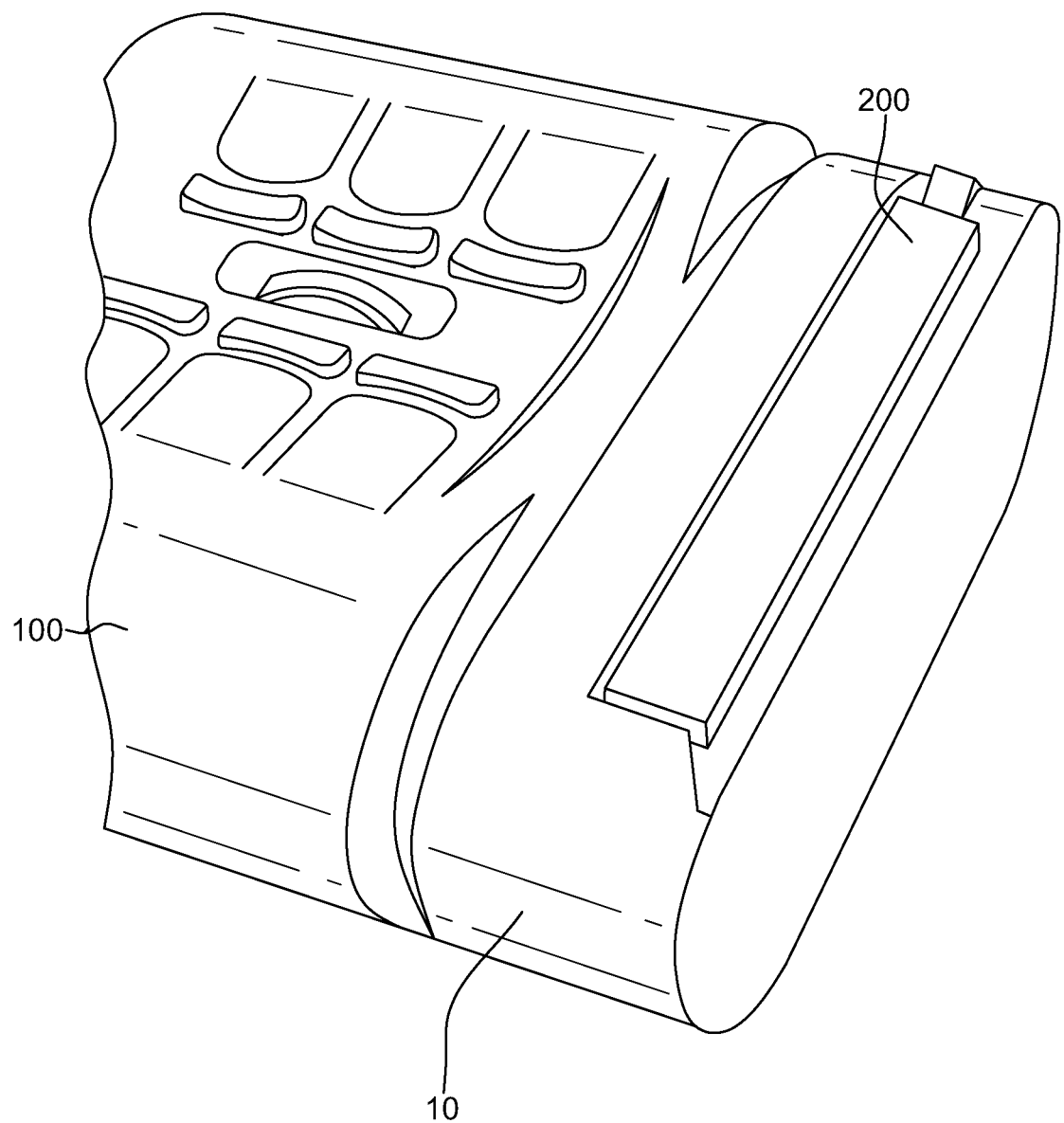
FIG. 2 is an isometric view of a bracket mounted on binoculars.

FIG. 1 illustrates a perspective view of an exemplary bracket 10 includes a body 12 having a top 14 and a bottom 16. The body has front face 18 and a wall 20. The front face 18 is substantially planar. The wall 20 is perpendicular to the front face 18, surrounds the front face, and extends rearward. The wall 20 is adapted to be mounted on binoculars 100 (see FIG. 2). A mounting portion 20A of the wall surrounds and retains binoculars 100. A shoulder portion 20B of the wall 20 provides a space between an end of the binoculars 100 and the front face 18.

An elongate slot 22 is located in the wall 20 at the top 14 of the body 12. The elongate slot 22 is sized and configured to be capable of receiving a sensor 200 (see FIG. 2) in the space between the end of the binoculars 100 and the front face 18.

A layer of cushion material 24 can be attached to an inner surface of the front face 18 to shield the sensor 200 from impact. The cushion material 24 can be closed cell foam, rubber, cork or other materials.

The elongate slot 22 can include a pass-thru hole 26 for a cable or other connector from the sensor 200. A cable pathway 28 is located within the body 12 opposite the elongate slot 22 and pass-thru hole 26. The cable pathway 26 provides a location for one or more cables or other connectors from the sensor 200 to extend outside the bracket 10.

An anchor aperture 30 can be provided on an interior of the wall 20 to secure the sensor 200 to the bracket 10. The cable or other connector from the sensor 200 can be secured to the bracket 10 using zip ties or other appropriate devices. The sensor 200 can be secured to the bracket 10 using screws or other appropriate fasteners using apertures 32 in the bottom 16 of the body 12.

Figure 3:
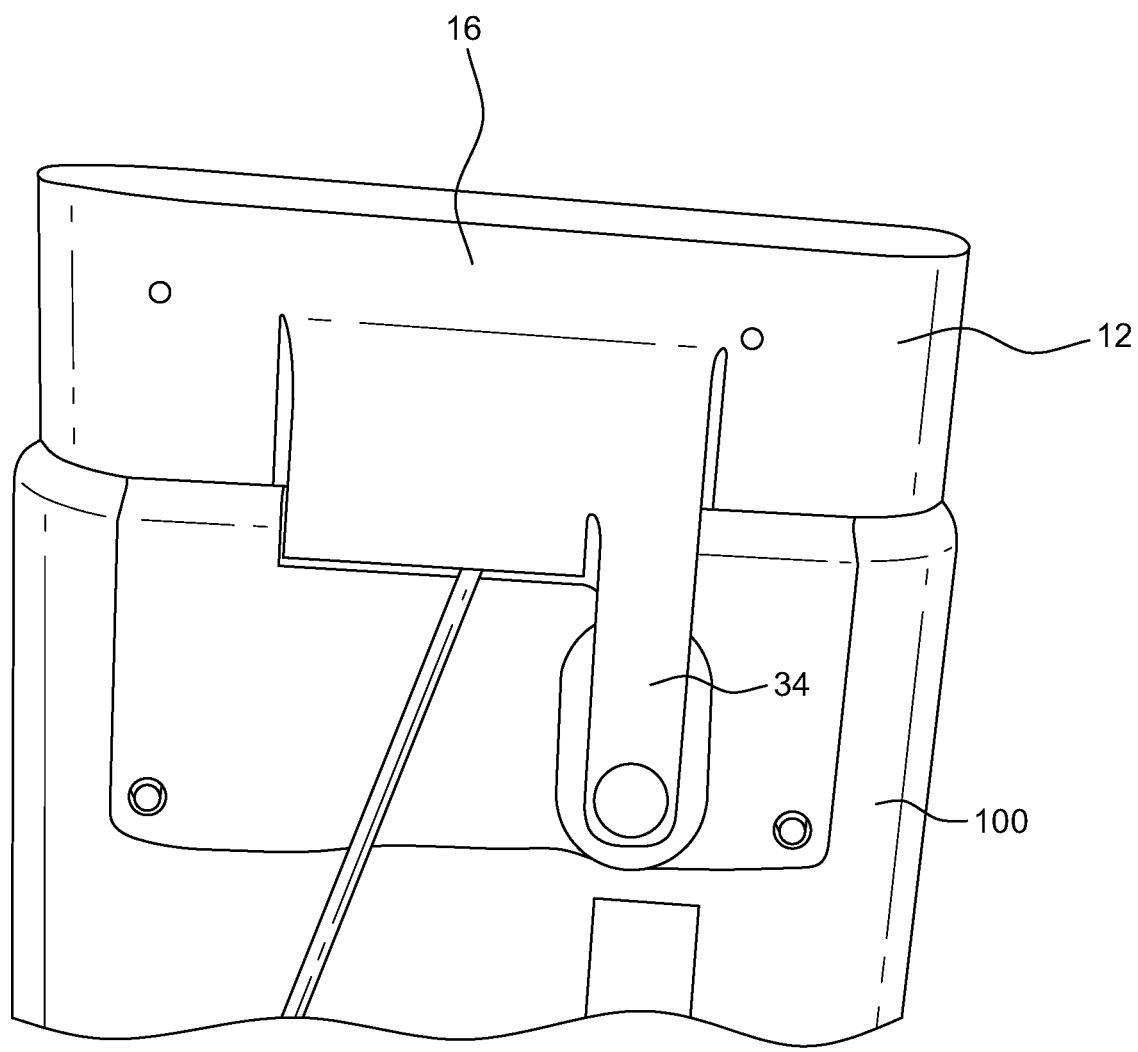
FIG. 3 is a bottom view of a bracket mounted on binoculars.

A tab 34 having a mounting aperture 35 extends from the bottom 16 of the body 12. The tab 34 can be removably affixed to the binoculars 100 using a screw or other appropriate fastener, as shown in FIG. 3.

To install a sensor 200 on the bracket 10, the cable or other connector from the sensor 200 is fed the cable through the pass-thru hole 26. The cable or other connector is routed in the cable pathway 28 so the sensor 200 can be installed in the elongate slot 22. The cable or other connector is secured to the anchor point 26 and the sensor 200 is secured to the bracket 10 by installing fasteners from inside the body 12 into the back of the sensor 200. The bracket 10 can be slipped on the front of the binoculars 100 and secured in place with a screw or other appropriate fastener using the tab 34.

It is contemplated that the invention is well suited for modern manufacturing methods. The bracket may be constructed by various fabrication means and materials, such as additive manufacturing (AM), multi-material treatments, and multi-material compositions. Further, the invention may be constructed using various material types, such as high performance plastics, such as ABS plastic, Thermal Plastic Poly-Urethane (TPU), etc. 3-D printable rubber may be used to provide increased impact resistance.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A bracket for attaching a sensor for a motion tracking system to binoculars, said bracket comprising:
   a body having a top and a bottom with a front face and a wall perpendicular to and surrounding a periphery of said front face, said wall sized to be mounted on the binoculars;
   an elongate slot in the top of said body sized with said elongate slot sized and configured to be capable of receiving the sensor therein;
   a cable pathway located within said body opposite said elongate slot and perpendicular to said elongate slot with said cable pathway capable of passing a cable from the sensor therethrough; and
   a tab having a mounting connector extending from the bottom of said body adjacent to said cable pathway and opposite to said front face wherein said tab can be removably affixed to the binoculars at a head mount aperture on the binoculars.

2. The bracket of claim 1, wherein said front face is substantially planar.

3. The bracket of claim 2, further comprising a layer of cushion material affixed to an inner surface of said substantially planar front face.

4. The bracket of claim 3, further comprising an anchor aperture on an interior of said wall with said anchor aperture capable of securing the sensor to said bracket.

5. A binocular mounting device comprising:
   an open-topped body for accommodating binocular barrels, said open-topped body comprising a wall as a front face and a wall perpendicular to and surrounding said front face and providing a space between an end of binoculars and said front face, said body having a cable pathway formed therein; and
   a tab extending from the bottom of said body adjacent to said cable pathway and opposite to said front face wherein said tab can be removably affixed to the binoculars at a head mount aperture on the binoculars;
   wherein said wall includes an elongate slot capable of receiving a sensor for a motion tracker in the space between the end of the binoculars and said open-topped body front face.

6. The binocular mounting device of claim 5, wherein said front face is substantially planar.

7. The binocular mounting device of claim 6, further comprising a layer of cushion material attached to an inner surface of said front face.

8. A bracket for attaching a sensor for a motion tracking system to binoculars, said bracket comprising:
   a front face having a periphery;
   a wall mounted perpendicularly to and surrounding the periphery of said front face and extending rearward therefrom, said wall having a top exterior surface with a sensor slot formed therein, an interior surface of said wall having a mounting portion for enclosing a front portion of the binoculars and a shoulder portion proximate the front face and sized to preserve a gap between the binoculars and said front face, said wall having a cable pathway formed in a bottom interior surface providing a gap between the shoulder portion, the mounting portion and the binoculars; and
   a tab joined to said wall and extending away from said front face toward a rear portion of the binoculars and having a mounting aperture formed therein, said mounting aperture being positioned for use with a head mount aperture on the binoculars.

* * * * *